United States Patent

[11] 3,612,728

[72] Inventor Keith H. Fulmer
     South Bend, Ind.
[21] Appl. No. 43,052
[22] Filed June 3, 1970
[45] Patented Oct. 12, 1971
[73] Assignee The Bendix Corporation

[54] RESILIENT ALIGNMENT BEARING
     10 Claims, 3 Drawing Figs.
[52] U.S. Cl. .................................................... 417/415,
                                                               64/23
[51] Int. Cl. ............................................... F04b 17/00,
                                                         F16d 3/06
[50] Field of Search ........................................ 417/415,
                                          360, 223; 310/90; 64/8, 23

[56]              References Cited
              UNITED STATES PATENTS
1,722,284  7/1929  Fisher ........................... 417/415 X
2,167,879  8/1939  Des Roches ................. 417/415 X Primary Examiner—Robert M. Walker
Attorneys—Plante, Hartz, Smith and Thompson and William N. Antonis ABSTRACT: A pumping apparatus for use in a power braking system. A bearing in a housing retains a rotatable shaft eccentrically connected to a piston. The rotatable shaft has a slot at the bottom of a stepped internal bore. A rotor of an electric motor is surrounded by a shell. One end of the rotor shaft is retained by an end bearing cap in the shell while the other end has a flattened portion extending past the open end of the shell. A resilient alignment member is positioned in the stepped bore. The flattened end of the armature shaft is guided through the resilient alignment member into engagement with the slot of the rotatable shaft until the surrounding shell is abuttingly secured to the housing. Now, any rotation of the armature shaft will be directly transferred by the rotatable shaft to provide reciprocating movement movement to the pump piston supplying fluid pressure to the braking system.

PATENTED OCT 12 1971　　3,612,728
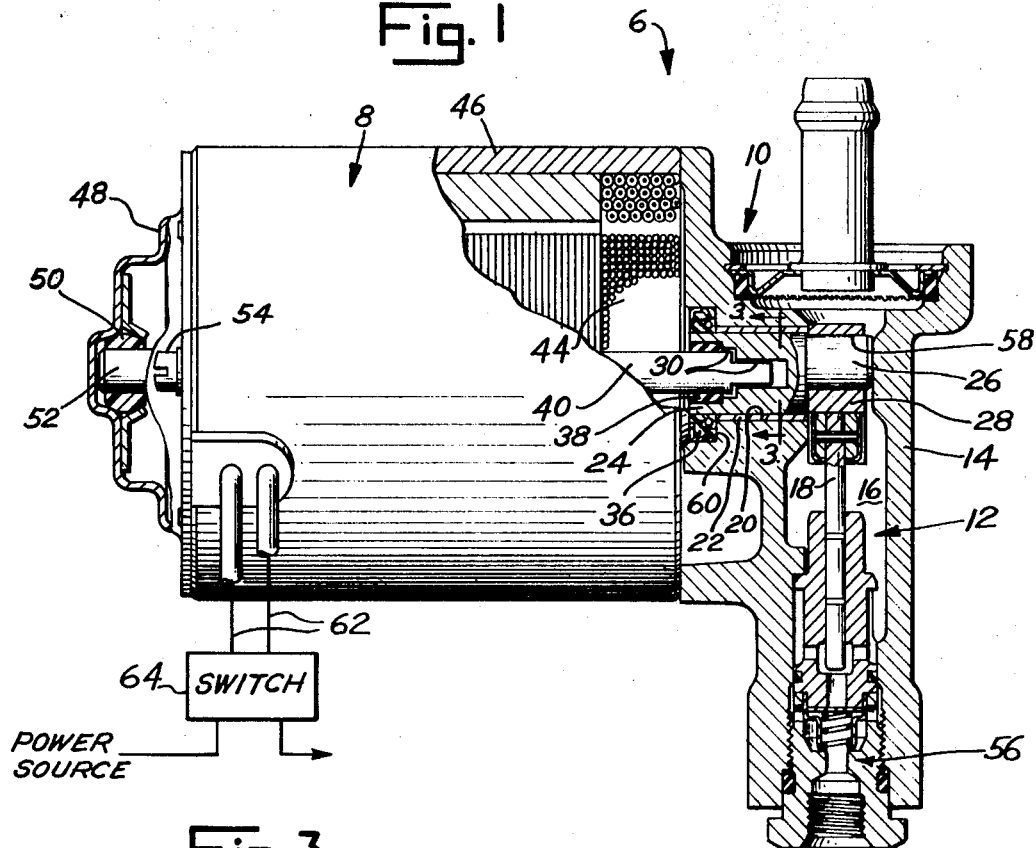
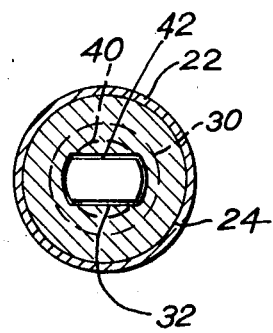
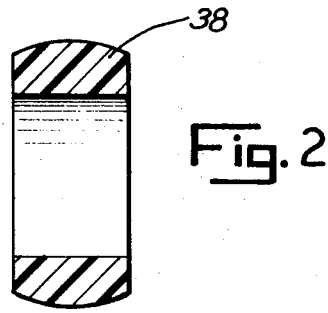
INVENTOR.
KEITH FULMER
BY
Plante, Hartz, Smith & Thompson
ATTORNEYS

RESILIENT ALIGNMENT BEARING

BACKGROUND OF THE INVENTION

In modern vehicles, the space under the hood to install components is decreasing while the need for additional power operated equipment has increased. In conformance with the Federal Highway Safety Legislation, vehicles constructed in the future will be required to have two independent sources of fluid pressure to assure operation of the power brakes. The use of hydraulically operated power brakes with an electrically operated secondary source would satisfy the requirements.

It is known in the prior art to use an electric motor to drive a pump supplying a braking system with fluid pressure. However, an external connection is needed to join the electric motor and pump into a working unit. This results in a bulky unit which utilizes too much of the available space under the hood.

SUMMARY OF THE INVENTION

In order to overcome the disadvantages of the prior art, I have invented a pumping apparatus that is compact and yet powerful enough to fully operate the power braking system.

In my device, a rotatable shaft member is retained in a bearing wall of a housing and eccentrically attached to a piston. The rotatable shaft member has a resilient bearing member positioned in an internal stepped opening for aligning the flattened shaft of a rotor of an electric motor into a keyed slot. The rotor is surrounded by a protective shell member which keeps the shaft in engagement by abutting a bearing wall common to the motor and the pump.

It is therefore an object of this invention to provide a compact pumping apparatus which has a single bearing wall between an electric motor and a pump piston member.

It is another object to provide a pumping mechanism with means to connect an electric motor to a piston member without binding the bearing members.

These and other objects will be readily apparent to those skilled in the art from viewing the drawing and reading the specification.

BRIEF DESCRIPTION OF THE DRAWINGS

FIG. 1 is a sectional view of a pumping apparatus constructed in accordance to the principles of my invention.

FIG. 2 is a cross sectional view of a resilient bearing member for aligning the armature shaft with the piston connecting means.

FIG. 3 is a cross sectional view taken along lines 3—3 of FIG. 1, showing the keyed joint of the power transfer connection.

DETAILED DESCRIPTION OF THE PREFERRED EMBODIMENT

The compact pumping apparatus 6 shown in FIG. 1 has an electric motor 8 connected by a rotatable power transfer means 10 to piston means 12, of a type described in U.S. Pat. No. 3,473,473 owned by the common assignee of this invention.

In more particular detail, the pump housing 14 has an axial bore 16 containing pump piston 18, and an opening 20 perpendicular to the axial bore 16. A sleeve-type bearing member 22 is retained in opening 20. A rotatable shaft 24 retained in bearing 22 has an eccentric projection 26 which extends into the axial bore 16. In axial bore 16 a pitman member 28 attached to pump piston 18 surrounds eccentric projection 26. The rotatable shaft 24 has a key slot 32, see FIG. 3, at the bottom of an internal stepped cylindrical opening 30. A seal 36 surrounds rotatable shaft 24 and is positioned adjacent bearing 22 in housing 14 to assure the fluid to be pumped is retained in bore 16.

A resilient alignment member 38, see FIG. 2, is inserted in cylindrical opening 30. A rotor shaft 40 with a flattened end 42, see FIG. 3, is inserted through resilient alignment member 38 into engagement with the key slot 32. The rotor winding 44 is protected by cylindrical shell 46. An end cap 48 having bearing member 50 carrying end 52 of rotor shaft 40 secures cylindrical shell in abutting position on housing 14 by bolts 54.

METHOD OF ASSEMBLY OF THE PREFERRED EMBODIMENT

Piston means 12 is inserted in the axial bore 16 of housing 14 until pitman member 28 is opposite opening 20. Check valve means 56 of a type described in U.S. Pat. 3,473,473 is attached to housing 14 to retain piston means 20 in the axial bore. A sleeve-type bearing member 22 is pushed into opening 20 and rotatable shaft 24 retained in bearing 22. The eccentric projection 26 of rotatable shaft 24 is aligned with hole 58 in pitman member 28 and pushed into opening 20 until seal 36 abuts wall 60 of the housing. Resilient alignment member 38 is inserted in stepped cylindrical opening 30 and the electric motor moving rotor shaft 40 with flattened end 42 which extends past cylindrical shell 46 is inserted into the resilient alignment member 38. Resilient alignment member 38 aligns the flattened end 42 with the key slot 32 in the bottom of the stepped opening 30. As shaft 40 is inserted in resilient bearing member 38, the shape of the resilient bearing member 38 changes from that shown in FIG. 2 to that of FIG. 1. Moreover the construction tolerance between shaft 40 and rotatable shaft 24 can be decreased since in the fully inserted position, as shown in FIG. 1, a tight joint occurs. The electric motor 8 is now held tight against housing 14 by screws 54.

OPERATION OF THE PREFERRED EMBODIMENT

If the hydraulic pressure from a supply source is below a predetermined level, a switch 64 is automatically closed permitting electricity to be supplied to motor 8 by leads 62 causing rotor 44 to turn shaft 40. This turning movement is directly transferred from shaft 40 to rotatable shaft 24. As rotatable shaft 24 turns, pitman 28 will pivot on eccentric projection 26 causing pump piston to reciprocate in bored chamber 16. The reciprocating motion will cause fluid to be forced past check valve means 56 to operate the power braking system (not shown) of a vehicle.

I claim:

1. In a braking system, means connecting an electric motor to a pump supplying said braking system with fluid pressure, said means comprising:
    a pump housing having an axial bore and a bore perpendicular to said axial bore therein;
    a rotatable member located in said perpendicular bore having an eccentric projection on one end thereof extending into said axial bore, said rotatable member having a stepped cylindrical bore in the other end thereof;
    piston means located in said axial bore of said pump housing;
    pitman means retained on said eccentric projection for reciprocating said piston means upon movement of said rotatable member;
    a motor housing with an open end surrounding a rotor of said electric motor, said rotor having a shaft extending past said open end; and
    aligning means within said stepped cylindrical bore for permitting said shaft to be joined to said rotatable member and thereby allow said motor housing to abut said pump housing to encase said rotor to form a single pumping unit.

2. In the braking system, as defined in claim 1, wherein said aligning means is resilient to permit alignment of said shaft with said slot and yet firm enough to form a rigid connection between said rotor and said rotatable member.

3. In the braking system, as defined in claim 2 wherein said pitman means pivots on said eccentric projection and said piston means to move said piston means in an axial line within said axial bore.

4. In the braking system, as defined in claim 3 wherein said rotor has a flattened end which is secured to a key slot in said stepped cylindrical bore.

5. A pumping apparatus, comprising:
a housing having a chamber and a perpendicular cylindrical bore connected to said chamber;
piston means within said chamber for supplying a system with fluid pressure;
a rotatable connecting shaft within said cylindrical bore, said connecting shaft being eccentrically connected to said piston means, said connecting shaft having an internal stepped bore with a slot at the bottom of said stepped bore;
a rotor shaft of an electric motor surrounded by a shell, one end of said rotor shaft having a flattened portion extending past the opening in said shell while the other end is retained in said shell;
a resilient alignment member located within said stepped bore of said connecting shaft; and
retaining means for joining said shell to said housing bringing said flattened portion of said rotor shaft through said resilient alignment member into engagement with said slot at the bottom of said stepped bore so that rotational movement of said rotor shaft will be transferred by said connecting shaft to provide reciprocating movement to said piston means through said eccentric connection.

6. The apparatus, as defined in claim 5, wherein said resilient alignment member retains said rotor shaft in alignment with said slot to provide a tight joint.

7. The apparatus, as defined by claim 6, wherein said rotatable connecting shaft is retained in a common bearing wall between said electric motor and said piston means, said rotatable connecting shaft having a projection extending into said chamber.

8. The apparatus, as defined in claim 7, wherein said piston means includes:
a pump piston; and
a pitman member pivotally attached to said pump piston, said pitman member surrounding said projection to provide said piston means with reciprocating movement upon rotation of said connecting shaft.

9. The apparatus, as defined in claim 7, wherein said electric motor is automatically activated in the event a primary source supplying fluid pressure to the braking system is below a predetermined level.

10. The apparatus, as defined in claim 5, including:
a common bearing wall supporting said rotatable connecting shaft attached to said electric motor and said piston means, said rotatable connecting shaft having an eccentric projection extending into said chamber;
a pitman member surrounding said eccentric projection and pivotally attached to said piston means, said pitman member moving on said eccentric projection to transmit reciprocating motion of said piston means;
a key slot at the bottom of said stepped bore of said rotatable member for receiving said flatted end of said rotor shaft; and
means responsive to an operational condition for controlling electricity to said electric motor.